United States Patent
Huenink et al.

(10) Patent No.: US 11,964,598 B2
(45) Date of Patent: Apr. 23, 2024

(54) UTILITY VEHICLE

(71) Applicant: DEERE & COMPANY, Moline, IL (US)

(72) Inventors: Brian M. Huenink, Cedar Grove, WI (US); Gregory O. McConoughey, Le Claire, IA (US)

(73) Assignee: Deere & Company, Moline, IL (US)

( * ) Notice: Subject to any disclaimer, the term of this patent is extended or adjusted under 35 U.S.C. 154(b) by 377 days.

(21) Appl. No.: 17/307,669

(22) Filed: May 4, 2021

(65) Prior Publication Data
US 2022/0063460 A1    Mar. 3, 2022

Related U.S. Application Data

(60) Provisional application No. 63/072,754, filed on Aug. 31, 2020.

(51) Int. Cl.
| | |
|---|---|
| *B60N 2/38* | (2006.01) |
| *B60N 2/00* | (2006.01) |
| *B60N 2/02* | (2006.01) |
| *B62D 33/06* | (2006.01) |

(52) U.S. Cl.
CPC ............... *B60N 2/38* (2013.01); *B60N 2/002* (2013.01); *B60N 2/02246* (2023.08); *B62D 33/0617* (2013.01)

(58) Field of Classification Search
CPC . B60N 2/38; B60N 2/002; B60N 2/02; B60N 2/24; B60N 2/0276; B60N 2002/981; B60N 2002/0268
USPC ......................................................... 340/438
See application file for complete search history.

(56) References Cited

U.S. PATENT DOCUMENTS

| | | | |
|---|---|---|---|
| 4,463,426 A | 7/1984 | Caddick et al. |
| 4,689,537 A | 8/1987 | Mizuta et al. |
| 7,597,398 B2 | 10/2009 | Lindsay |
| 7,669,928 B2 | 3/2010 | Snyder |
| 7,681,949 B2 | 3/2010 | Nathan et al. |
| 7,684,949 B2 | 3/2010 | Koerner |
| 7,708,343 B2 | 5/2010 | Kayumi et al. |
| 9,321,373 B2 | 4/2016 | Sakata et al. |

(Continued)

FOREIGN PATENT DOCUMENTS

| | | |
|---|---|---|
| DE | 19919216 C2 | 10/2001 |
| DE | 102004016315 A1 | 10/2005 |

(Continued)

OTHER PUBLICATIONS

German Search Report issued in German patent application No. 102021207766.8, dated Jun. 1, 2022, 8 pages.

*Primary Examiner* — Joseph D. Pape
(74) *Attorney, Agent, or Firm* — Tucker Ellis LLP; Michael G. Craig; Heather M. Barnes

(57) ABSTRACT

A utility vehicle includes a chassis, a prime mover supported by the chassis, an operator cab supported by the chassis, a control system including a controller, an operator support positioned within the operator cab and having a seat portion and a backrest portion and an actuator positioned within at least one of the seat portion and the backrest portion. The actuator is in communication with the controller and configured to move in a first pattern in response to a first notification signal from the controller in order to relay information to the operator.

20 Claims, 3 Drawing Sheets

(56) References Cited

U.S. PATENT DOCUMENTS

| | | |
|---|---|---|
| 9,848,814 B2 | 12/2017 | Benson et al. |
| 10,399,492 B1 * | 9/2019 | Paraskevas ............... B60Q 9/00 |
| 10,773,624 B2 | 9/2020 | Morrow |
| 2006/0255920 A1 * | 11/2006 | Maeda ................. B60N 2/0232 340/407.1 |
| 2013/0342335 A1 * | 12/2013 | McQueen ................ G08B 6/00 340/436 |
| 2013/0342337 A1 * | 12/2013 | Kiefer .................. B60W 50/16 340/438 |
| 2013/0342366 A1 * | 12/2013 | Kiefer ..................... B60Q 9/00 340/407.1 |
| 2014/0008948 A1 * | 1/2014 | Rockwell ............... B60N 2/002 297/217.3 |
| 2017/0147958 A1 | 5/2017 | Hatfield et al. |
| 2017/0297581 A1 | 10/2017 | Hatfield et al. |
| 2020/0334923 A1 * | 10/2020 | Yamamoto ............... B60Q 9/00 |

FOREIGN PATENT DOCUMENTS

| | | | |
|---|---|---|---|
| DE | 102007015432 A1 * | 10/2008 | ........... B60N 2/4415 |
| DE | 102008004121 A1 | 7/2009 | |
| DE | 102013211721 A1 | 12/2013 | |
| DE | 102015219461 A1 | 4/2017 | |
| DE | 102018007365 A1 | 1/2019 | |
| GB | 2441416 A * | 3/2008 | ............... B60Q 9/00 |
| KR | 1019970036515 A | 7/1997 | |

* cited by examiner

UTILITY VEHICLE

CROSS-REFERENCES TO RELATED APPLICATIONS

This application claims priority to co-pending U.S. Provisional Patent Application No. 63/072,754 filed on Aug. 31, 2020, the contents of which is incorporated herein by reference.

FIELD

The present subject matter relates to haptic operator alerts for a utility vehicle.

SUMMARY

In one embodiment, a utility vehicle includes a chassis, a prime mover supported by the chassis, an operator cab supported by the chassis, a control system including a controller, an operator support positioned within the operator cab and having a seat portion and a backrest portion and an actuator positioned within at least one of the seat portion and the backrest portion. The actuator is in communication with the controller and configured to move in a first pattern in response to a first notification signal from the controller in order to relay information to the operator.

In other embodiment, an operator cab assembly for a utility vehicle is disclosed. The utility vehicle includes an implement that is selectively coupled thereto. The operator cab assembly includes an operator cab, an operator support positioned within the operator cab and having a seat and a backrest, and an actuator positioned within at least one of the seat and the backrest. The actuator is in communication with a control system including a controller. The actuator configured to move in a first pattern in response to a first notification signal and to move in a second pattern in response to a second notification signal different than the first notification signal.

In another embodiment, a control system for alerting an operator of information during use of a utility vehicle is disclosed. The control system includes a controller that is configured to receive a first alert including information to be relayed to the operator, generate a first notification signal corresponding to the first alert, send the first notification signal to an actuator supported by an operator support, and in response to receiving the first notification signal, activate the actuator in a first pattern at a first frequency for a first amount of time to communicate the first alert to the operator.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
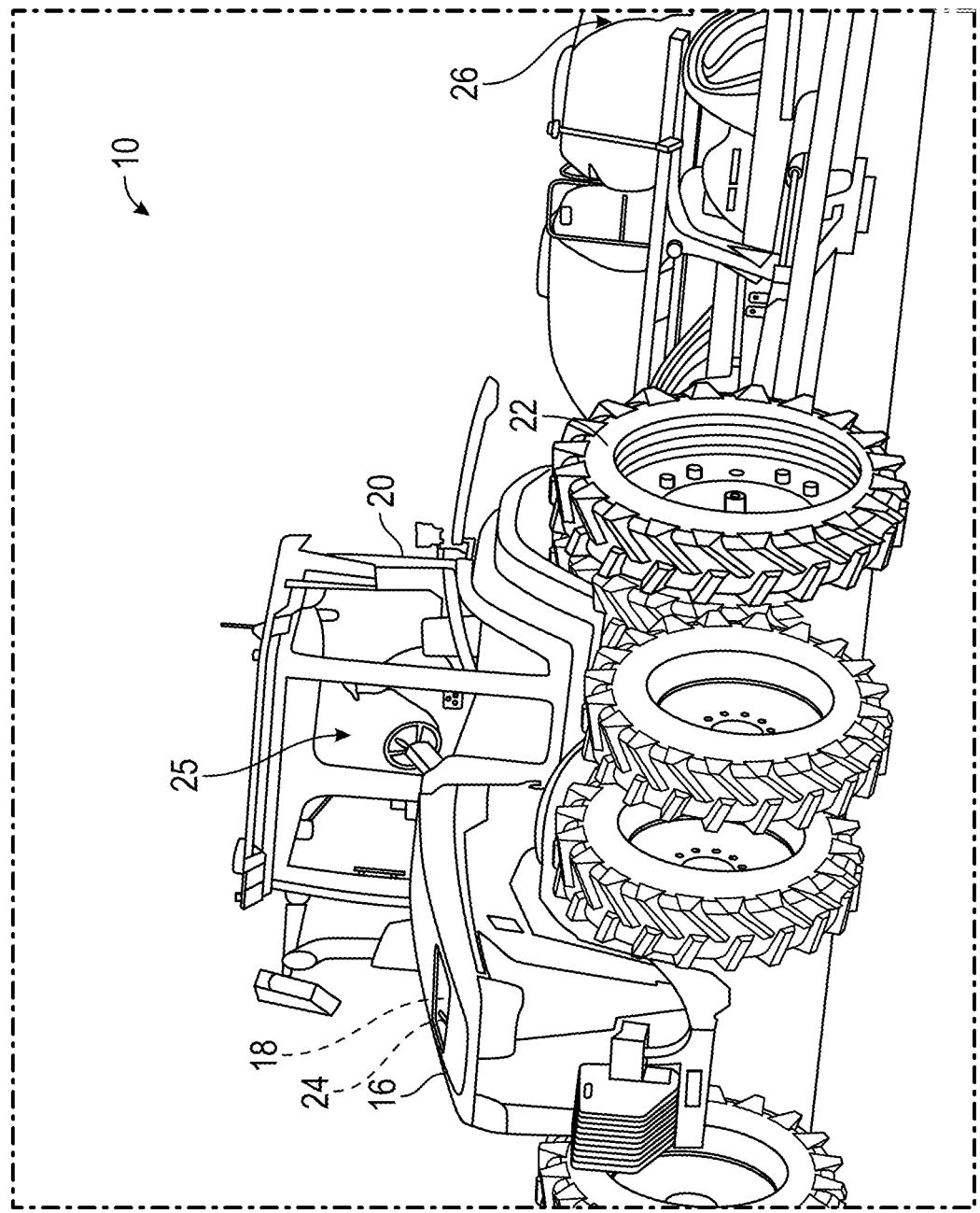
FIG. 1 shows a perspective view of a utility vehicle including an operator cab.

FIG. 1 illustrates a utility vehicle 10. The utility vehicle 10 is in the form of a tractor; however, the utility vehicle 10 may be, for example, a riding lawn mower, harvester, crop sprayer, or other utility vehicle for agricultural, forestry, construction, mining, or other commercial or industrial use. The utility vehicle 10 includes a chassis 16, a prime mover 18, an operator cab 20, a plurality of ground-engaging devices 22, and a control system 24.

The prime mover 18 is configured to move the utility vehicle 10 in a direction of travel via the ground engaging devices 22. The illustrated ground-engaging devices 22 are wheels, but tracks or other suitable ground-engaging devices can be utilized. The chassis 16 supports the prime mover 18 and the control system 24. The prime mover 18 can include an engine, such as a diesel engine, and the control system 24 can include a vehicle control unit (VCU). In the illustrated embodiment, the utility vehicle 10 may include an implement 26 in the form of a planter coupled to the chassis 16. In other embodiments, the utility vehicle 10 may include any suitable implement 26 (e.g., a ripper, front end loader, bucket, manure spreaders, etc.), and the implement may be coupled instead to the front of the chassis 16. Still in other embodiments, the utility vehicle 10 may include more than one implement 26 coupled to the chassis 16. For example, a first implement may be coupled to the front of the chassis 16 and a second implement may be coupled to the rear of the chassis 16.

Figure 2:
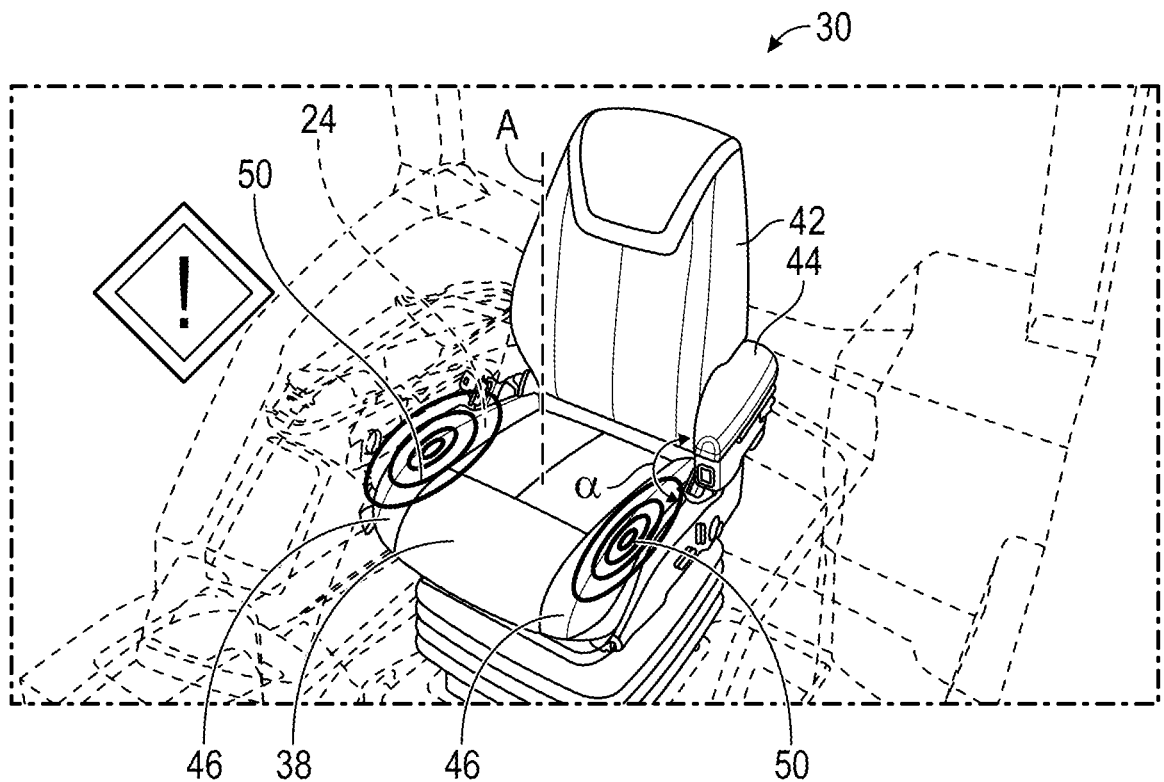
FIG. 2 is a perspective view of a chair positioned within the cab of the utility vehicle of FIG. 1.
Figure 3:
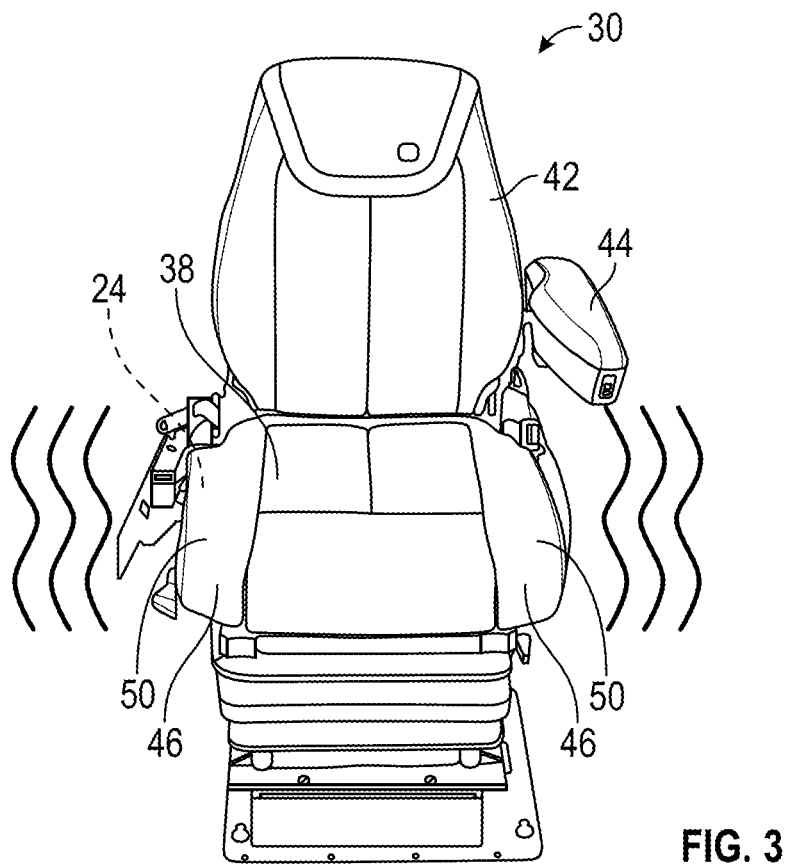
FIG. 3 is a front perspective view of the chair positioned within the cab of the utility vehicle of FIG. 1.

Referring to FIGS. 1 and 2, the cab 20 includes a vehicle operation system 25 and an operator support 30 (e.g., a chair). The vehicle operation system 25 is positioned in the cab 20 and can include different combinations of input devices, such as a steering wheel, control levers, joysticks, control pedals, control buttons, control displays, and other input devices. The operator is typically seated in the chair 30 during use and can actuate one or more of the input devices of the vehicle operation system for purposes of operating the utility vehicle 10 and the attached implement 26.

Referring to FIG. 2, the chair 30 includes a seat 38, a backrest 42 coupled to the seat 38 and generally transverse thereto, and one or more armrests 44 positioned on either or both sides of the seat 38. The seat 38 and/or the backrest 42 may include cushion bolsters 46 on one or both sides of the seat 38 and/or the backrest 42 that provide support for the operator. The chair 30 is movable or adjustable relative to the cab 20. In some embodiments, the chair 30 may move or translate forward, rearward, up, and down, and may also be rotatable about an axis A. In some embodiments, the backrest 42 is movably or adjustably coupled to the seat 38 to adjust an angle α therebetween. The one or more armrests 44 may move or pivot relative to the seat 38. The chair 30 may have other configurations, for example, chair 30 may be a stool or bench, and therefore may not have a backrest.

One or more actuators 50 are positioned in at least one of the seat 38 or the backrest 42. In the illustrated embodiment, the actuator 50 is a haptic motor (such as the one shown and described in U.S. Pat. No. 7,684,949, the contents of which are incorporated herein by reference) but in other embodiments the actuator 50 may have any suitable configuration that generates movement in response to an input and that can be sensed by the operator through the material of the cushion bolsters 46 or other portions of the chair.

In some embodiments, the one or more actuators 50 are positioned within each of the cushion bolsters 46 positioned on opposite sides of the seat 38. In some embodiments, one or more actuators 50 may be located within each of the cushion bolsters 46 positioned on opposite sides of the backrest 42. In other embodiments, one or more actuators may be positioned elsewhere within the seat 38 and/or the backrest 42, e.g., centrally or at some position between the cushion bolsters 46, or within the one or more armrests 44. In some embodiments, one or more actuators 50 may be positioned elsewhere in the cab 20 as well, such as within one or more of the input devices (e.g., the steering wheel, the joystick, etc.).

Figure 4:
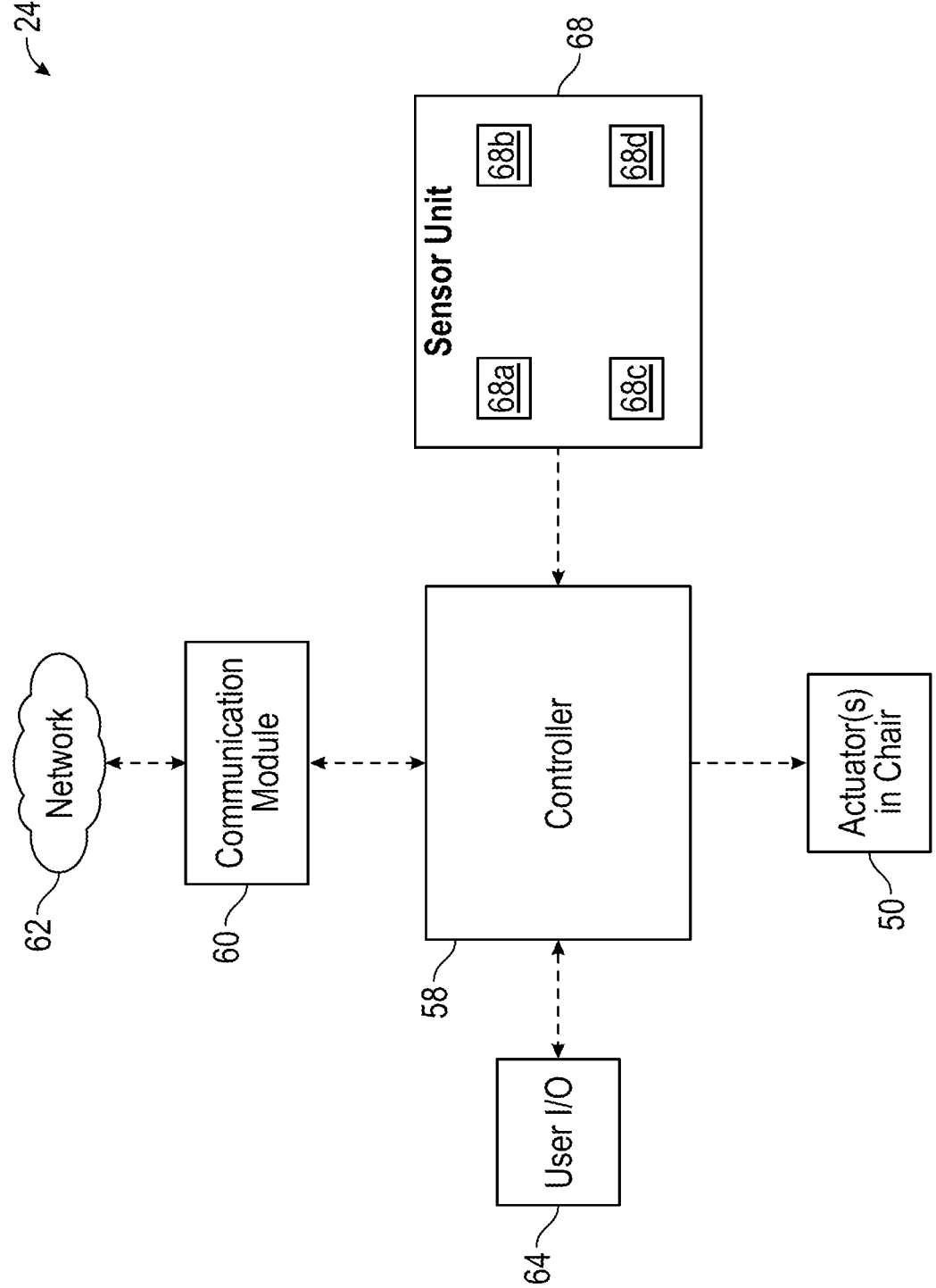
FIG. 4 is a schematic of a control system of the utility vehicle of FIG. 1.

A sensor unit 68 comprising one or more sensors is configured to detect information relating to the utility vehicle 10 and the implement 26. As shown in FIG. 4, one or more sensors can detect information relating to utility vehicle position and function (e.g., transmission function, electrical system function, wheel position and characteristics, brake function, proximity to obstructions or other vehicles, etc.), implement position and function, and characteristics of the ground surface (e.g., proximity to headland, proximity to obstructions or other vehicles, etc.), among other information. For example, a sensor 68a may be positioned within the cab 20, a sensor 68b may be positioned on the chassis 16, a sensor 68c may be positioned adjacent the prime mover 18, a sensor 68c may be positioned on the connections for the implement 26, and a sensor 68d may be positioned on the implement 26. These sensor locations are merely exemplary, and other sensors may be positioned at any suitable other location relative to the utility vehicle 10 and the implement 26. Although described as a single unit related to the utility vehicle 10 and/or implement 26, the sensor unit 68 can encompass sensors positioned at any position within the utility vehicle or associated with the utility vehicle to detect or record operating and environmental information. For example, the sensor unit 68 may further include one or more cameras, lasers, (e.g., for LIDAR or other laser scanning), or scanners.

The actuators 50 and sensor unit 68 are in communication with the control system 24, which includes a controller 58. The controller 58 has a plurality of inputs and outputs that are operable to receive and transmit information and commands to and from the actuators 50 and the sensor unit 68. Communication between the controller 58 and the actuators 50 and the sensor unit 68 can be accomplished through a CAN bus, another communication link (e.g., wireless transceivers), or through a direct connection. The control system 24 further includes a operator input/output module 64 that includes the one or more operator input devices, which are in communication with the controller 58. The operator input/output module 64 can also include one or more input/output mechanisms such as, for example, the input devices of the vehicle operation unit 25 located in the cab 20.

The controller 58 includes memory for storing software, logic, algorithms, programs, a set of instructions, etc. for controlling the actuators 50 and other components. The controller 58 also includes a processor for carrying out or executing the software, logic, algorithms, programs, set of instructions, etc. stored in the memory.

The control system 24 further includes a communication module 60 configured to connect to and communicate with other devices (e.g., a computer, another work machine, a central management station or console, etc.) through a network 62. The network 62 can be, for example, a wide area network ("WAN") (e.g., a global positioning system ("GPS"), a TCP/IP based network, a cellular network, etc.). Communications through the network 62 by the communications module 60 or the controller 58 can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

The connections between the illustrated communications module 60 and the network 62 are wireless to enable freedom of movement and operation of the utility vehicle 10 without being physically tethered to a computer or other external processing device to facilitate such communications. The connections between the controller 58 and the communications module 60 may be wired connections, wireless connections, or a combination of wireless and wired connections.

The controller 58 is configured to communicate information to the operator through the activation and resulting movement of the one or more actuators 50, which are positioned to be felt by the operator seated in the chair 30. The movement or patterns of movement of the one or more actuators 50 may include one or a combination of vibrations, pulses, or shakes at one or more frequencies and/or for differing periods of time. The information may be unrelated to the operation of the utility vehicle or the information may be generated by the sensor information from the sensor unit 68, as described herein. Exemplary information that is unrelated to the operation of the utility vehicle 10 may include, but is not limited to, an alert that the operator is receiving information external to the vehicle or operation thereof (e.g., a phone call or message). Exemplary information generated by the sensor information from the sensor unit 68 may include, but is not limited to, an alert related to a diagnostic trouble code (DTC), an alert related to product levels and/or product flow, an alert related to proximity of the utility vehicle or implement relative to an obstruction (e.g., a tree or another vehicle), or a guidance warning (e.g., existence of a nearby headland).

In an exemplary embodiment, the controller 58 is configured to receive information from the sensor unit 68 or otherwise and determine whether or not to notify the operator of this information. If the controller 58 determines that notification is warranted, the controller 58 is configured to send a notification signal, which is uniquely based on the information and the predetermined significance of the information, to the actuators 50. Accordingly, one or more of the actuators 50 is configured to move in a predetermined pattern of movement, which could include variations in intensity, frequency, and timing, or synchronization or patterning of more than one actuator 50 (further described herein), in response to the notification signal from the controller 58. The controller 58 may be configured to send any number of notification signals based on the information to be relayed. The correspondence of a particular notification signal to be sent from the controller 58 with the type of information received can be stored in the memory of the controller 58. The operator may also or alternatively be able to program the controller 58 to include additional information/signal parameters or settings.

Moreover, each of the notification signals sent by the controller 58 may be based on the significance of the notification. For example, a notification signal that corresponds to information that must be addressed immediately (e.g., information related to sensed proximity) may be designated with a "high setting," a notification signal that corresponds to information that does need to be addressed but not immediately (e.g., a DTC code that does not to be addressed immediately) may be designated with a "medium setting," and notification signal that corresponds to more passive information (e.g., receipt of a phone call or message) may be designated with a "low setting." Accordingly, for example, a first notification signal may correspond to the high setting (e.g., a first setting) and be used for information designated as requiring attention by an operator within a first time period (e.g., quickly or immediately), a second notification signal may correspond to the medium setting (e.g., a second setting) and be used for information designated as requiring attention by the operator within a second time period longer than the first time period (e.g., within a few hours or a few days), and a third notification signal may correspond to the low setting (e.g., a third setting) and be used for information designated as requiring attention by the operator within a third time period longer than the second time period (e.g., at any time). The differences between high settings, medium settings, and low settings may be programmed into the controller 58 as discussed and correlated to certain types of information from certain types of sensors, the type of operational setting, the particular operator, or otherwise.

Additionally, the notification signals may be directional. For example, if the controller 58 receives information based from a first side of the utility vehicle, the controller 58 may be configured to actuate the one or more actuators 50 on a side of the seat 38 corresponding to the first side of the vehicle. On the other hand, the controller 58 may be configured to actuate actuators 50 on both sides of the seat 38 together (e.g., concurrently) to increase the haptic response for an increasing condition in which only one actuator 50 would normally be activated. In still other embodiments, the controller 58 may be configured to activate one or more of the actuators 50 together or separately and using the same or different movements or patterns of movement at different frequencies for different periods of time.

In an exemplary embodiment, the controller 58 may be configured to determine that the operator is receiving a phone call or message from a non-critical number and send a first notification signal to the one or more actuators 50 thereby causing the one or more actuators to move in a first pattern of movement at a first frequency for a first amount of time to alert the operator that he is receiving the call. In another example, the controller 58 may be configured receive information from the sensor unit 68 that a ground object is approaching and send a second notification signal to the one or more actuators 50 different than the first notification signal, thereby causing the one or more actuators 50 to move in a second pattern of movement at a second frequency for a second amount of time to alert the operator that an object is approaching the path of travel.

Excessive audible and visual alerts to the operator can overwhelm the operator causing him to tune out the alerts. Reliance on a single sense, such as either hearing or sight, may cause significant fatigue. The tactile sensations created by movement of the actuators 50 enable the control system to provide alerts, warnings, and other notifications to the operator without diverting attention from the task.

Although the present subject matter has been described in detail with reference to certain embodiments, variations and modifications exist within the scope of one or more independent aspects of the present subject matter, as described.

What is claimed is:

1. A utility vehicle comprising:
a chassis;
a prime mover supported by the chassis;
an operator cab supported by the chassis;
a control system including a controller;
an operator support positioned within the operator cab and having a seat portion and a backrest portion; and
an actuator positioned within at least one of the seat portion and the backrest portion, the actuator in communication with the controller and configured to move in a first pattern in response to a first notification signal from the controller and in a second pattern in response to a second notification signal from the controller in order to relay information to the operator, wherein the controller is configured to communicate, via the first notification signal, information related to the utility vehicle and, via the second notification, information unrelated to operation of the utility vehicle.

2. The utility vehicle of claim 1, wherein the actuator is configured to move in a second pattern in response to a second notification signal from the controller in order to relay additional information to the operator, wherein the controller is further configured to communicate, via the first notification signal, information unrelated to the utility vehicle and, via the second notification signal, information related to operation of the utility vehicle.

3. The utility vehicle of claim 2, wherein the first notification signal is related to information obtained from a sensor on a first side of the chassis and activates an actuator on a first side of the seat portion in order to provide directional information to the operator related to operation of the utility vehicle, and the second notification signal is related to information obtained from a sensor on a second side of the chassis and activates an actuator on a second side of the seat portion in order to provide directional information to the operator related to operation of the utility vehicle.

4. The utility vehicle of claim 1, wherein the control system further includes one or more sensors configured to detect information relating to at least one of a position of the utility vehicle, an operational state of the utility vehicle, and a position of an attached implement, the sensors configured to provide the detected information to the controller.

5. The utility vehicle of claim 1, wherein the actuator is a first actuator and further comprising a second actuator positioned within at least one of the seat portion and the backrest portion, the second actuator being in communication with the controller, the first and second actuators configured to move concurrently in the first pattern in response to the first notification signal.

6. The utility vehicle of claim 1, wherein the actuator is a first actuator and further comprising a second actuator positioned within at least one of the seat portion and the backrest portion, the second actuator being in communication with the controller and configured to move in a second pattern in response to a second notification signal from the controller in order to relay information to the operator, the second pattern being different from the first pattern.

7. The utility vehicle of claim 1, wherein the information unrelated to the utility vehicle includes information relating to an attached implement position and/or an implement function.

8. The utility vehicle of claim 1, wherein the information unrelated to the utility vehicle includes a notification that the operator is receiving external communication comprising a phone call or a message.

9. An operator cab assembly for a utility vehicle, the utility vehicle including an implement that is selectively coupled thereto, the operator cab assembly comprising:
an operator cab;

an operator support positioned within the operator cab and having a seat and a backrest; and an actuator positioned within at least one of the seat and the backrest, the actuator in communication with a control system including a controller and configured to move in a first pattern in response to a first notification signal and to move in a second pattern in response to a second notification signal different than the first notification signal, in order to relay information to the operator, wherein the controller is configured to communicate, via the first notification signal, information related to the utility vehicle and, via the second notification, information unrelated to operation of the utility vehicle.

10. The operator cab assembly of claim 9, wherein the first notification signal is related to information obtained from a sensor on a first side of the operator cab and activates an actuator on a first side of the seat portion and the second notification signal is related to information obtained from a sensor on a second side of the operator cab and activates an actuator on a second side of the seat portion.

11. The operator cab assembly of claim 9, wherein the control system further includes one or more sensors configured to detect information relating to at least one of a position of the utility vehicle, an operational state of the utility vehicle, and a position of the implement, the sensors configured to provide the detected information to the controller.

12. The operator cab assembly of claim 9, wherein the first notification signal corresponds to a first setting used for information designated as requiring attention by an operator within a first time period and the second notification signal corresponds to a second setting designated as requiring attention by the operator within a second time period, the first time period being less than the second time period.

13. The operator cab assembly of claim 12, wherein the first pattern of movement is of a higher intensity or longer duration than the second pattern of movement.

14. A control system for alerting an operator of information during use of a utility vehicle including an operator cab and an operator support supported within the operator cab, the control system comprising:

a controller configured to
receive a first alert including information related to the utility vehicle; generate a first notification signal corresponding to the first alert;
send the first notification signal to an actuator supported by the operator support;
in response to receiving the first notification signal, activate the actuator in a first pattern to communicate the first alert to an operator; and
receive a second alert including information unrelated to operation of the utility vehicle; generate a second notification signal corresponding to the second alert;
send the second notification signal to an actuator supported by the operator support; and
in response to receiving the second notification signal, activate the actuator in a second pattern to communicate the second alert to an operator.

15. The control system of claim 14, wherein the first alert corresponds to information related to operation of the utility vehicle and is generated by the sensor information from a sensor unit that is configured to communicate with the controller.

16. The control system of claim 14, wherein the first alert corresponds to information external to the vehicle or operation thereof.

17. The control system of claim 14, wherein the actuator is a first actuator, and the controller is further configured to:
receive the second alert including information to be relayed to the operator;
generate the second notification signal corresponding to the second alert;
send the second notification signal to a second actuator supported by the operator support; and
in response to receiving the second notification signal, activate the second actuator in a second pattern to communicate the second alert to the operator.

18. The control system of claim 17, wherein the first alert corresponds to first sensed information from a sensor unit that is configured to communicate with the controller, and wherein the second alert corresponds to second sensed information from the sensor unit.

19. The control system of claim 17, wherein the first alert corresponds to sensed information from a sensor unit in communication with the controller, and wherein the second alert corresponds to information external to the vehicle or operation thereof.

20. The control system of claim 17, wherein the second pattern is different than the first pattern.

* * * * *